United States Patent [19]

Hashimoto

[11] Patent Number: 4,553,204
[45] Date of Patent: Nov. 12, 1985

[54] CENTRAL PROCESSING UNIT RESTORING MECHANISM FOR A SYSTEM HAVING A PLURALITY OF CENTRAL PROCESSING UNITS

[75] Inventor: Takashi Hashimoto, Tokyo, Japan

[73] Assignee: Pioneer Electronic Corp., Tokyo, Japan

[21] Appl. No.: 396,201

[22] Filed: Jul. 8, 1982

[30] Foreign Application Priority Data

Jul. 9, 1981 [JP] Japan .................... 56-108006

[51] Int. Cl.[4] ........................... G06F 11/00
[52] U.S. Cl. .................... 364/200; 371/12; 307/34; 340/825.16
[58] Field of Search ............ 371/12, 14, 7-9; 340/825.16; 364/200 MS File, 900 MS File, 132, 483, 492; 377/30, 32, 200; 361/52, 59, 68, 71; 323/267, 271, 272, 322, 909; 307/30, 34, 38, 39, 40

[56] References Cited

U.S. PATENT DOCUMENTS

| | | | |
|---|---|---|---|
| 3,581,075 | 5/1971 | Taby et al. | 371/14 |
| 3,894,247 | 7/1975 | De Jong | 307/592 |
| 4,051,326 | 9/1977 | Badagnani et al. | 364/900 X |
| 4,162,526 | 7/1979 | Gass et al. | 364/200 |
| 4,174,496 | 11/1979 | McFall et al. | 323/235 |
| 4,204,249 | 5/1980 | Dye et al. | 364/200 |
| 4,386,400 | 5/1983 | Cope et al. | 364/200 |

FOREIGN PATENT DOCUMENTS 2035633 8/1979 United Kingdom ........ 371/12

Primary Examiner—James D. Thomas
Assistant Examiner—David L. Clark
Attorney, Agent, or Firm—Sughrue, Mion, Zinn Macpeak & Seas

[57] ABSTRACT

A two-way data communication system using a plurality of CPUs is provided with at least one CPU which detects abnormalities in the operation of further CPUs and accordingly cuts the power to and resets an erroneously operating CPU.

4 Claims, 3 Drawing Figures

CENTRAL PROCESSING UNIT RESTORING MECHANISM FOR A SYSTEM HAVING A PLURALITY OF CENTRAL PROCESSING UNITS

BACKGROUND OF THE INVENTION

This invention relates to a system in which central processing units are provided in a plurality of electronic devices in a manner such that two-way data communication is carried out between the central processing units, and more particularly to a central processing unit restoring mechanism in such a system, which can reset a central processing unit when the latter operates erroneously, and which is simple in arrangement.

A variety of electronic devices incorporate central processing units (or microprocessor units) so as to perform two-way data communication therebetween. Sometimes, the operations of the central processing units become abnormal because of static electricity, noise, etc. In order to prevent such erroneous operations, electronic devices have been proposed in the art, which include error checking programs causing the CPU to reset itself when an erroneous operation takes place. However, such electronic devices are disadvantageous in that they are relatively high in manufacturing cost.

SUMMARY OF THE INVENTION

In view of the foregoing, this invention is intended to provide a central processing unit restoring mechanism for a system having a plurality of central processing units, which operates to reset the power source of a central processing unit which is determined to be erroneously operating, to thereby readily restore the central processing unit to normal operation.

DETAILED DESCRIPTION OF THE PREFERRED EMBODIMENTS

As conducive to a full understanding of the invention, a CATV system, which is an example of a system in which data communication is carried out, will first be described.

Figure 1:
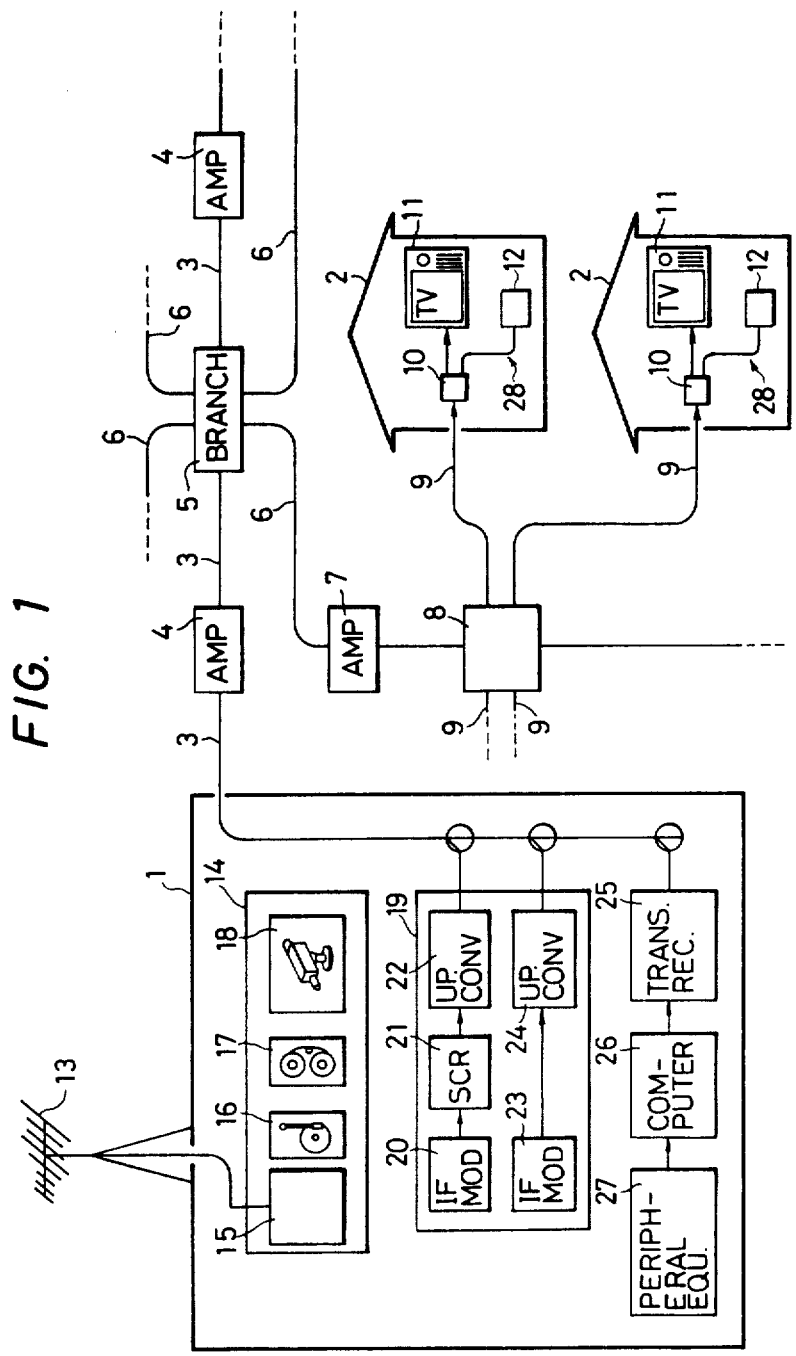
FIG. 1 is an explanatory diagram outlining a CATV system as one example of a two-way data communication system.

A CATV system of the invention will be described with reference to FIG. 1. The CATV system includes a single base or center 1 and terminal units 28 which are provided, for example, in several tens of thousands of subscriber's homes. The center 1 is connected through coaxial cables to the terminal units 28. A main cable 3 extends from the center 1 and main cable amplifier 4 and branching units 5 are provided at predetermined positions on the main cable 5. A plurality of branch cables 6 extend from each branching unit 5. Extension amplifiers 7 and tap-off units 8 are provided at predetermined points on the branch cables 6. Each tap-off unit 8 is connected to branch lines 9 which extend to a terminal units 28 in individual homes 2. Each terminal unit 28 includes a main unit 10, a television set 11 and a control unit 12. The branch line 9 is connected to the main unit 10 which is in turn connected to the television set 11 and to the control unit 12. As is apparent from the above description, the main cable extending from the center is branched into a first plurality of branch cables which are further branched into a second plurality of branch lines which are finally connected to the terminal units 28.

A signal receiving antenna 13 is installed outside the center 1. The antenna 13 is connected to a demodulator 15 in a source group 14 of the center 1. The source 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an up-converter circuit 22, while the other system includes an IF modulator circuit 23 and an up-converter circuit 24. The outputs of the up-converters 22 and 24 are connected to the main cable 3, to which a data transceiver 25 is connected for data communication between the center 1 and each main unit 10. The data transceiver 25 is connected to a computer 26 which is connected to a peripheral unit 27 such as a printer or a display unit.

The operation of the CATV system thus constructed will now be described.

First, the power switch of the television set 11 is turned on. With the television set 11 set to a particular unused channel, the control unit 12 is operated so that the frequency of a desired channel to be received is set to that of the unused channel. The channels which can be selected by the control unit 12 as described above can be classified into three groups of channels for (A) retransmission programs in which television signal from local stations are received without modification, (B) independent programs (free of charge), and (C) chargeable (pay) programs. Each group is allocated ten channels, and therefore any of the thirty channels can be selected by operating the control unit 12.

(A) Retransmission Programs

Television signals received by the antenna 13 are demodulated by the demodulator 15 and applied to the modulation output section 19. The signal thus applied is modulated by the IF modulator circuit 23. The frequency of the signal thus modulated is increased to a predetermined frequency by the up-converter circuit 23 according to a determined frequency allocation scheme. That is, it is assigned to a predetermined channel, and the resultant signal is applied through the main cable 3, the branch cables 6, and the branch lines 9 to the television sets 11.

(B) Independent Programs

The independent programs include locally originating programs such as weather forecast programs, news programs, and the like. In the case of programs recorded on discs of the video disc player 16 or on the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge. That is, the "price" of these programs is included in the basic monthly charge paid by the subscriber.

(C) Chargeable Programs

The chargeable programs include new movie programs, special programs, and the like. In the case of programs provided by the video disc player 16 or the video tape recorder 17 or in the case of live programs produced in the studio 18, the video signal is modulated by the IF modulator circuit and is processed by the scrambler circuit 21 so that the signal cannot be reproduced without special signal processing. Then, the frequency of the signal is increased to that of a predetermined designated channel, and is applied to the main cable 3. In order to receive the chargeable programs, the video signal must be descrambled by the main unit 10 in the subscriber's home 2 so that a regular image appears on the television set 11. The subscriber is charged for the reception of the chargeable programs. That is, predetermined charges therefor are summed, and the user is requested to pay a special charge at a measured rate in addition to the basic monthly charge.

As described above, the center 1 is connected through coaxial cables to the terminal units in the subscriber's homes 2. However, in order to change the subscribers for the reception of the chargeable programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called via their assigned address numbers. That is, the channels received by the terminal units at the time of transmission of the retrieving signal are detected, this operation being referred to as "polling." In response to this polling, each terminal unit 28 "answers" the data transceiver 25 with data representative of the channel received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of second and therefore audience ratings can be readily calculated.

Sometimes, the subscribers may participate in the production of programs. In this case, by operating the control units 12, they can answer questions proposed in a program or the like while watching the television sets 11. The answers are transmitted through the coaxial cables to the center 1.

In such a CATV system, a central processing unit (CPU) is incorporated in each of the main boxes 10 and the control boxes 12, and data communication is effected between the CPUs.

Figure 2:
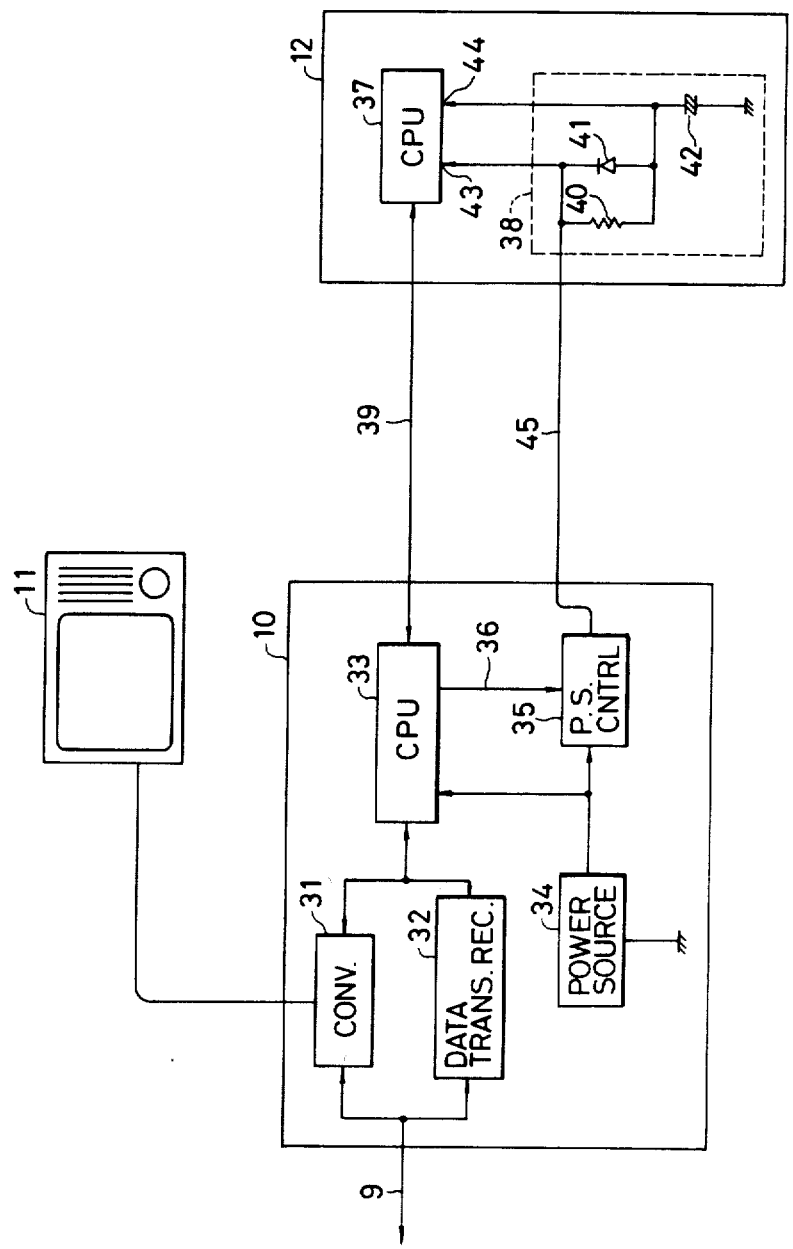
FIG. 2 is a block diagram showing a first embodiment of this invention.

FIG. 2 shows a system having a plurality of CPUs according to one embodiment of this invention. In this case, the main box 10 and the control box 12 have CPUs, respectively, so that two-way data communication is effected between the two CPUs. The branch cable 9 is connected to a converter 31 and a data transmitting and receiving device 32 which are accommodated in the main box 10. The output of the converter 31 is connected to the television set 11. The converter 31 and the data transmitting and receiving device 32 are connected to the CPU 33. Furthermore, a power source section 34 for supplying DC power is provided in the main box 10. The output of the power source section 34 is applied to the CPU 33 and a power source control section 35, to which a control signal 36 is applied by the CPU 33.

On the other hand, the CPU 37 and a reset section 38 are provided in the control box 12. The CPU 37 is connected through a data line 39 to the CPU 33 in the main box 10. The reset section 38 includes a resistor 40; a diode 41; and a capacitor 42. The resistor 40 is connected in parallel to the diode 41. One end of the parallel circuit is connected to the power terminal 43 of the CPU 37, and the other end is connected to that terminal of the capacitor 42 which is also connected to the reset terminal 44 of the CPU 37. The other terminal of the capacitor is grounded. The first end of the parallel circuit including the resistor 40 and the diode 41 is further connected through a control line 45 to the power source control section 35.

The operation of the circuitry thus organized will now be described.

When the power switch is turned on, DC voltage is supplied from the power source section 34 to the CPU 33 and it is further supplied through the power source control section and the control line 45, so that the main box 10 and the control box 12 are operated. Under this operative condition, two-way data communication can be effected between the two CPUs 33 and 37. The "down" data signal from the center 1 is received by the data transmitting and receiving device 32 and is transmitted to the CPU 33. In response to the "down" data signal, the CPU 33 applies necessary instructions to the CPU 37, so that the latter may make necessary responses, i.e., send necessary data signals to the CPU 33. The answer data signals from the CPU 37 are suitably processed in the CPU 33 and are then transmitted, as "up" data signals, to the data transmitting and receiving device 32. The data signals, after being modulated, are transmitted through the branch cable 9 to the center 1 by the data transmitting and receiving device 32. If the two CPUs 33 and 37 operate satisfactorily, two-way data communication can be carried out; however, if the CPU 37 is operated erroneously or abnormally because of static electricity or noise, data communication cannot be carried out. Therefore, in the case where, although the CPU 33 has transmitted a data signal, the answer data signal to the data signal is not suitable or no answer is made, the CPU 33 determines that the CPU 37 is in an abnormal state. The CPU 33 thus applies a control signal 36 to the power source control section 35. In response to the control signal 36, the power source control section 35 temporarily interrupts the application of current to the control line 45, as a result of which the capacitor 42 is discharged. After a predetermined period of time, the power source control section 35 operates to again apply the supply voltage to the control line 45. The supply voltage is applied directly to the power terminal 43 of the CPU 37; however, the voltage applied to the reset terminal 44 rises in a time period determined from the time constant of the resistor 40 and the capacitor 42. The rise of the voltage applied to the reset terminal 44 resets the CPU 37, as a result of which two-way data communication can be again carried out.

Figure 3:
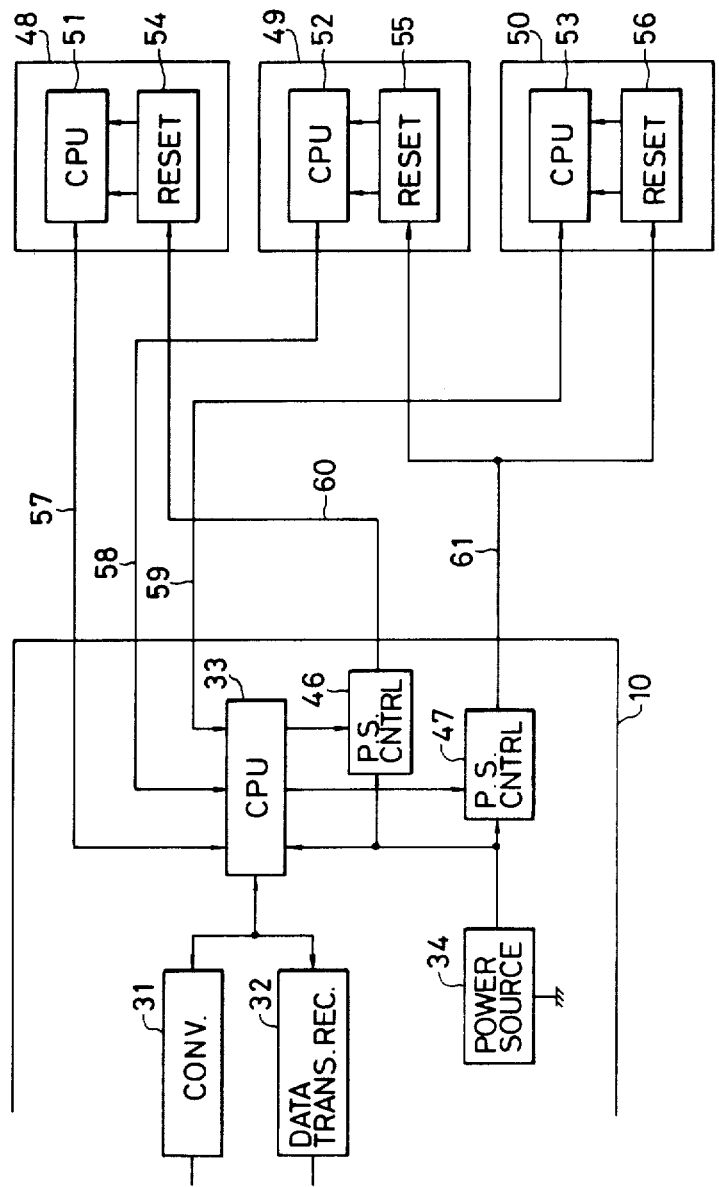
FIG. 3 is a block diagram showing a second embodiment of the invention.

FIG. 3 shows another embodiment of the invention. In this embodiment, one main box 10 and a plurality of terminal units 48, 49 and 50 are provided having CPUs 33, 51, 52 and 53, respectively, so that a plurality of two-way data communications are carried out therebetween. The CPU 33 of the main box 10 is connected through the lines 57, 58 and 59 respectively to the CPUs 51, 52 and 53 in the terminal units. Power source control sections in the main box 10 are connected through power source control lines 60 and 61 to the reset sections 54 and 55, 56 in the terminal units 48, 49 and 50.

In the second embodiment, when the CPU 33 detects an abnormal operation of a CPU 51 through 53 in the terminal units 48 through 50, the power source control sections 46 and 47 temporarily stop the application of supply voltage, to thereby reset the CPUs. In this case, the power source control section 47 can reset the CPUs 52 and 53 at the same time.

Thus, according to the invention, when the central processing units provided for two-way data communication in the terminal units of a CATV system operate abnormally, a simple arrangement is used to reset the central processing units, so that the operations thereof may return to normal.

What is claimed is:

1. In a system comprising a plurality of central processing units wherein two-way data communication is effected between said central processing units; the improvement comprising a central processing unit restoring mechanism, comprising: at least one power source control section connected to and responsive to a first of said central processing units for controlling the application of power to a group of remaining ones of said central processing units, said group comprising at least one of said central processing units, a power supply unit connected directly to said first central processing unit and, via said power source control section, to said group of central processing units, and a group of reset sections, each said section connected to and associated with a respective one of said central processing units in said group, each said reset section being connected to and operated by said power source control section to reset a respective central processing unit, said group of reset sections comprising at least one reset section.

2. A system as claimed in claim 1, said first central processing unit including means for detecting erroneous operation of said remaining central processing units.

3. A system as claimed in claim 2, said power source control section interrupting the application of power to an erroneously operating central processing unit for a predetermined time, in response to said first central processing unit detecting said erroneous operation.

4. A system as claimed in claim 1, wherein each of said reset sections comprises an input terminal, first and second output terminals, and a time constant circuit connected between said input and second output terminals, said input terminal receiving a signal from said power source control section, said input terminal being connected to said first output terminal, said first output terminal being connected to the power supply terminal of an associated central processing unit, and said second output terminal coupled to a reset terminal of said associated central processing unit.

* * * * *